(12) United States Patent
Kritt et al.

(10) Patent No.: US 9,078,127 B2
(45) Date of Patent: *Jul. 7, 2015

(54) SECURE COMMUNICATION METHOD

(71) Applicant: LENOVO ENTERPRISE SOLUTIONS (SINGAPORE) PTE. LTD., New Tech Park (SG)

(72) Inventors: Barry A. Kritt, Raleigh, NC (US); Sarbajit K. Rakshit, Kolkata (IN)

(73) Assignee: Lenovo Enterprise Solutions (Singapore), PTE. LTD., New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/176,196

(22) Filed: Feb. 10, 2014

(65) Prior Publication Data

US 2014/0195806 A1 Jul. 10, 2014

Related U.S. Application Data

(63) Continuation of application No. 13/675,591, filed on Nov. 13, 2012, now Pat. No. 8,948,391.

(51) Int. Cl.
*H04L 9/32* (2006.01)
*H04W 12/04* (2009.01)
(Continued)

(52) U.S. Cl.
CPC .............. *H04W 12/04* (2013.01); *H04L 9/3215* (2013.01); *H04L 63/0492* (2013.01); *H04L 63/18* (2013.01); *H04W 4/02* (2013.01); *H04W 12/02* (2013.01); *H04W 84/12* (2013.01)

(58) Field of Classification Search
None
See application file for complete search history.

(56) References Cited

U.S. PATENT DOCUMENTS 7,051,196 B2   5/2006   Angelo et al.
7,480,801 B2   1/2009   Euchner et al.
(Continued)

FOREIGN PATENT DOCUMENTS

DE   102010041804 A1   4/2012

OTHER PUBLICATIONS

"Avec Mobile: How to Make Secure Phone Calls with a GSM Mobile Phone"; Printed Aug. 20, 2012; Copyright Andalys Ltd 2004-2011; <http://www.avecmobile.com/index/php?id=1505>.0.
Berket, K et al.; "PKI-Based Security for Peer to Peer Information Sharing"; Proceedings of the Fourth International Conference on Peer to Peer Computing (PsP '04); Copyright 2004 IEEE.
(Continued)

*Primary Examiner* — Gilberto Barron, Jr.
*Assistant Examiner* — Malcolm Cribbs
(74) *Attorney, Agent, or Firm* — Katherine Brown

(57) ABSTRACT

A first computing device receives over a telecommunications network from a second computing device a verification message encrypted using a public key. The verification message is generated by the second computing device when initiating a call to the first computing device. The first computing device transmits to a wireless router via a wireless local area network (WLAN) created by the wireless router, the encrypted verification message. The first computing device receives from the wireless router over the WLAN, a decrypted verification message decrypted from the encrypted message by the wireless device using a private key associated with the public key. The first computing device transmits over the telecommunications network to the second computing device, the decrypted verification message. If the second computing device determines that the decrypted verification message corresponds to the encrypted verification message, the second computing device allows the call to the first computing device to proceed.

19 Claims, 7 Drawing Sheets

(51) Int. Cl.
*H04W 12/02* (2009.01)
*H04L 29/06* (2006.01)
*H04W 4/02* (2009.01)
*H04W 84/12* (2009.01)

(56) References Cited

U.S. PATENT DOCUMENTS

| | | |
|---|---|---|
| 8,010,469 B2 | 8/2011 | Kapoor et al. |
| 2002/0059525 A1* | 5/2002 | Estes et al. ............ 713/200 |
| 2003/0074552 A1 | 4/2003 | Olkin et al. |
| 2005/0138374 A1 | 6/2005 | Zheng et al. |
| 2006/0206709 A1* | 9/2006 | Labrou et al. ............ 713/167 |
| 2006/0242404 A1* | 10/2006 | Su ............ 713/150 |
| 2006/0293028 A1* | 12/2006 | Gadamsetty et al. ......... 455/411 |
| 2007/0050618 A1 | 3/2007 | Roux et al. |
| 2008/0056272 A1* | 3/2008 | Batta ............ 370/395.5 |
| 2008/0098237 A1* | 4/2008 | Dung et al. ............ 713/189 |
| 2009/0247146 A1 | 10/2009 | Wesby |
| 2010/0192197 A1 | 7/2010 | Nadalin et al. |
| 2010/0220850 A1 | 9/2010 | Gisby et al. |
| 2011/0249817 A1 | 10/2011 | Park et al. |
| 2012/0191615 A1 | 7/2012 | Schibuk |

OTHER PUBLICATIONS

Braga De Faria; "Scalable Location-Based Security in Wireless Networks; A Dissertation Submitted to the Department of Computer Science and the Committee on Graduate Studies of Stanford University in Partial Fulfillment of the Requirements for the Degree of Doctor of Philosophy"; Dec. 2006; Copyright by Daniel Braga de Faria 2007.

"IEEE 802.11n—2009 IEEE Standard for Information Technology, Specific Requirements Part 11: Wireless LAN Medium Access Medium (MAC) and Physical Layer (PHY) Specifications Amendment 5: Enhancements for Higher Throughput"; Oct. 29, 2009; Institute of Electronics Engineers, Inc.

"Kerckhoffs's Principle—Wikipedia, The Free Encyclopedia"; Printed Nov. 26, 2011; <http://en.wikipedia.org/w/index.php?title=Kerckhoffs's_principle&oldid=462526320>.

"Public-key Cryptography-Wikipedia, The Free Encyclopedia"; Printed Aug. 20, 2012; <http://en.wikipedia.org/wiki/Public-key_cryptography>.

"Secure Telephone-Wikipedia, The Free Encyclopedia"; Printed Aug. 20, 2012; <http://en.wikipedia.org/wiki/Secure_telephone>.

"STU-III—Wikipedia, The Free Encyclopedia"; Printed Aug. 20, 2012; <http://en.wikipedia.org/wiki/STU-III>.

* cited by examiner

SECURE COMMUNICATION METHOD

CROSS REFERENCE TO RELATED APPLICATION

This application is a continuation of U.S. patent application Ser. No. 13/675,591 filed Nov. 13, 2012 now U.S. Pat. No. 8,948,391 the entire content and disclosure of which is incorporated herein by reference.

FIELD OF THE INVENTION

The present invention relates generally to the field of computer security, and more particularly to implementing a key-based encryption scheme on a network routing device.

BACKGROUND OF THE INVENTION

The secure exchange of computer documents over a network has long been a requirement in many business environments. The most common method employed is to encrypt the document on the sending computer system, and decrypt it on the receiving computer system. An encryption technique that is widely used is based on an asymmetric public/private key pair technique. In public/private key pair encryption, a private key is created, and a public key is generated from the private key using a mathematical algorithm that is practically impossible to apply in reverse. The holder of the private key makes the public key available to all who wish to send encrypted messages to the private key holder. Messages that are encrypted using the public key can only be decrypted by the private key. In this system, security depends on the secrecy of the private key.

Another method that is used for the secure exchange of computer documents employs location-based security. In these methods, access to a document typically depends on the geographic location of the computer systems receiving and/or sending the document. Determining a computer system's geographic location can be done, for example, using a satellite navigation chipset embedded in the computer system that processes signals from one of the satellite navigation systems, such as the Global Positioning System (GPS) maintained by the U.S. Department of Defense. These systems typically will allow access to a document only if the sending and/or receiving systems were or are at particular geographic locations when the document was transmitted by the transmitting system, or opened by the receiving system. Location-based security methods can be used in conjunction with, or integrated into, encryption systems.

SUMMARY

Embodiments of the present invention disclose a method, computer program product, and system for providing secure telephonic communication. A first computing device, for example a smartphone, receives over a telecommunications network from a second computing device, for example, another smartphone, a verification message encrypted using a first cryptographic key, for example, a public key of a public/private asymmetric key pair. The verification message is generated by the second computing device when initiating a call to the first computing device over the telecommunications network. The first computing device transmits to a wireless device via a wireless channel between the first computing device and the wireless device, for example, a wireless router via a WLAN, the encrypted verification message. The first computing device receives from the wireless device over the wireless channel a decrypted verification message decrypted from the encrypted message by the wireless device that uses a second cryptographic key associated with the first cryptographic key, for example, the public key of the public/private asymmetric key pair. The first computing device transmits over the telecommunications network to the second computing device, the decrypted verification message. If the second computing device determines that the decrypted verification message corresponds to the encrypted verification message, the second computing device allows the call to the first computing device to proceed.

DETAILED DESCRIPTION

Figure 1:
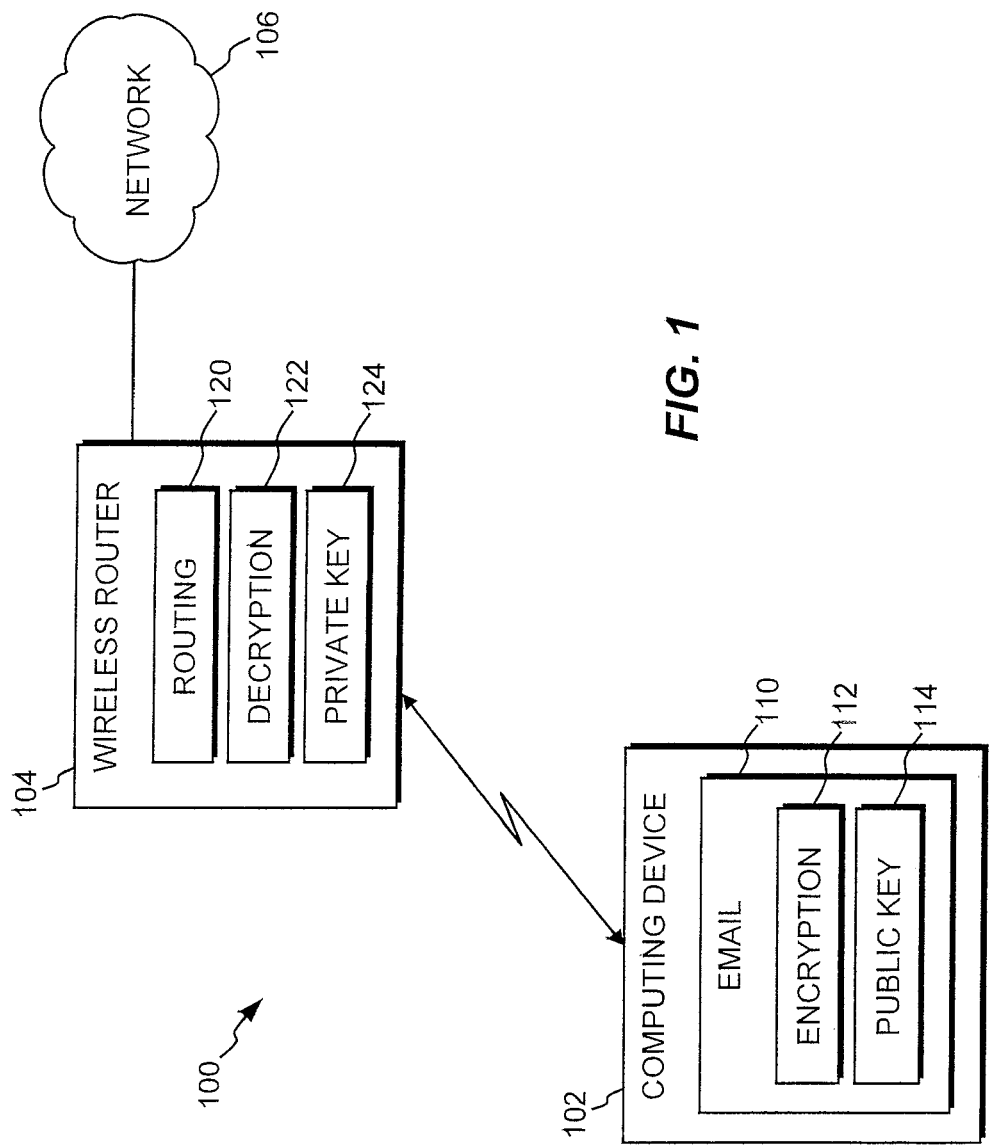
FIG. 1 is a functional block diagram illustrating a secure communication system in a wireless environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments of the present invention generally describe an encryption-based system in which documents encrypted and transmitted by a computing device in a wireless network can be decrypted only by a recipient in the same or an associated wireless network. After receipt by the recipient, the encrypted document is transmitted by the recipient to a wireless device, such as a wireless router, for decryption. The wireless router decrypts the document and transmits it back to the recipient. In preferred embodiments, attributes of the decrypted document prevent saving, copying, forwarding, and printing the decrypted document. In this manner, secure transmission and access of documents can be established within a geographic area defined by the range of one or more wireless routers, and further refined by limiting access to the router(s) to specific computing devices.

FIG. 1 is a functional block diagram illustrating a secure communication system 100 in a wireless environment, in accordance with an embodiment of the present invention. In a preferred embodiment, secure communication system 100 includes computing device 102, wireless router 104, and network 106. In a preferred embodiment, wireless router 104 creates a wireless local area network (WLAN) in accordance with the Institute of Electrical and Electronics Engineers (IEEE) 802.11 protocol. Computing device 102 connects to the WLAN in accordance to an IEEE 802.11 compatible security algorithm, such as, for example, Wi-Fi Protected Access (WPA), Wi-Fi Protected Access II (WPA2), or Wired Equivalent Privacy (WEP). Wireless router 104 can provide access to network 106 for wireless devices connected to the wireless router, such as computing device 102, directly via bridging functionality integral to wireless router 104, or in conjunction with bridging functionality, not shown, that is accessible by wireless router 104. Network 106 can be, for example, a local area network (LAN), a wide area network (WAN) such as the Internet, or a combination of the two, and can include wired, wireless, or fiber optic connections.

In various embodiments of the present invention, computing device 102, which is described in more detail below with respect to FIG. 5, can be a laptop computer, tablet computer, netbook computer, personal computer (PC), a desktop computer, a personal digital assistant (PDA), a smart phone, or any programmable electronic device capable of wirelessly communicating with wireless router 104, and supporting the functionality required of embodiments of the invention.

In a preferred embodiment, computing device 102 includes email program 110, which further include encryption module 112 and public key 114. Email program 110 represents a commercially available, open source, or proprietary email client that includes the encryption functionality represented by encryption module 112 and public key 114, and additional email client functionality in accordance with embodiments of the invention, as described herein. This functionality can, for example, be integral to the email client software, or available to the email client in the form of extensions, plug-ins, or add-ons to the email client.

In preferred embodiments of the invention, email program 110 includes typical email functionality, such as the creation, sending, and receiving of email messages from and to other compatible email clients on computing devices accessible to computing device 102 via wireless router 104. In addition to the typical email functionality, email program 110 also includes encryption functionality. Encryption module 112 operates to encrypt outgoing email messages transmitted by email program 110 in accordance with a public/private key encryption system using public key 114. In a preferred embodiment of the invention, public key 114 is paired with private key 124 installed on wireless router 104, and is received from the wireless router in response to a request from encryption module 112. This request can occur, for example, when encryption module 112 is initially installed on computing device 102.

In embodiments of the invention, public/private key pairs are associated with security groups. For example, a security group can be all members of a particular project team working on a secure project. For each member of the project team, their email clients would use a particular public key for encryption, and the associated private key, for example private key 124, would be installed on, and be securely maintained on, wireless routers accessible by team members, such as wireless router 104. In certain embodiments, a user of a computing device may be a member of more than one security group. In these embodiments, the email client residing on the computing device, for example email program 110 on computing device 102, may store several public keys 114. Outgoing email messages can be encrypted with the appropriate public key based on, for example, the recipient(s) of the email message, other data or metadata associated with the outgoing email message, or based on user input.

Depending on the desired level of secure communications, different encryption settings can be applied. For example, in an exemplary embodiment where a high level of security is desired, every email sent by computing device 102 will be encrypted by encryption module 112 using public key 114. In addition, the email will include an attribute to inhibit saving, copying, forwarding, and printing the emails by compatible email clients and other programs. In another exemplary embodiment, all email messages sent to fellow members of a security group will automatically be encrypted using the appropriate public key, and email messages sent to recipients who are not in a security group to which the sender is a member will not be encrypted. In another exemplary embodiment, encryption of each outgoing message is at the discretion of the user of computing device 102, for example via a "secure send" delivery option.

Although preferred embodiments of the invention are implemented using an asymmetric public/private key encryption scheme, other suitable cryptographic or shared secret schemes can be used. In general, any scheme by which a sending entity can ensure that a receiving entity is within a specified security group and within a specified geographic area can be used.

Email program 102 also operates to transmit encrypted messages received from other email clients to wireless router 104 for decryption. This can occur, for example, when email program 102 attempts to open an encrypted message. The encrypted email message is transmitted to wireless router 104, which decrypts the message and sends it back to the sending email client. In exemplary embodiments, the encrypted email message can be sent to wireless router 104 using, for example, the User Datagram Protocol (UDP) and a specific port number. In general, any suitable communications protocol may be used, in accordance with an embodiment of the invention. In embodiments in which more than one public key 114 is available for encrypting outgoing email messages, email program 110 will also send a public key identifier to wireless router 104 to allow the wireless router to choose the proper private key to decrypt the encrypted email message.

In a preferred embodiment, wireless router 104, which is described in more detail below with respect to FIG. 4, includes routing module 120, decryption module 122, and private key 124. Routing module 120 operates in a typical manner to provide wireless routing connectivity for wireless devices connected to wireless router 104. For example, messages between computing device 102 and other computing devices directly connected to wireless router 104 can be routed directly by the wireless router; messages between, for example, computing device 102 and computing devices accessible via network 106 are routed to network 106.

Decryption module 122 operates to receive encrypted email messages from computing device 102, decrypt the message using private key 124, and transmit the decrypted messages back to computing device 102. As mentioned above, in exemplary embodiments, email client 102 can exchange data with decryption module 122 using UDP messages over specific ports. To ensure a measure of geographically based security, decryption module 122, for example, only decrypts messages received from computing devices that are connected to the network via wireless router 104.

In certain embodiments, wireless router 104 may serve more than one security group. In this case, a different private key 124 for each security group can be securely maintained on wireless router 104. Encrypted email messages received by decryption module 122 for decryption will contain a public key identifier, which can be the public key, to allow decryption module 122 to choose and apply the correct private key 124. Also, in certain embodiments, it is not necessary for the computing device sending the email to be connected to the wireless router on which the private key resides. For example, computing device 102 can send an encrypted email to a recipient from any location; however, the receiving email client has to be within range of the wireless router on which the private key resides in order to decrypt the email.

Although the preferred embodiment includes a wireless router, in general, wireless router 104 can be any wireless device that can establish a wireless channel to computing device 102, and includes at least the functionality of decryption module 122 and private key 124. For example, the wireless device can be a computing device, such as a laptop or desktop computer, with ad hoc wireless network capability. When the wireless device and computing device 102 are within wireless range of each other, and a wireless channel has been established between them, the functionality described above in which computing device 102 sends the encrypted email message to the wireless device for decryption can be performed.

In alternative embodiments, private keys 124 can be securely maintained in a central store rather than on the wireless device. In these embodiments, for example, after decryption module 122 receives the encrypted message and public key identifier, if needed, from computing device 102, decryption module 122 requests from the central store a copy of the private key associated with the public key identifier. To maintain the security of this request, the private keys in the central store can be associated with a wireless device identifier, which can be included in the private key request and confirmed, before the private key is returned to the wireless device. In addition or alternatively, the request and the private key can be exchanged between decryption module 122 and the central store using an encryption scheme, such as a public/private key encryption scheme.

Figure 2:
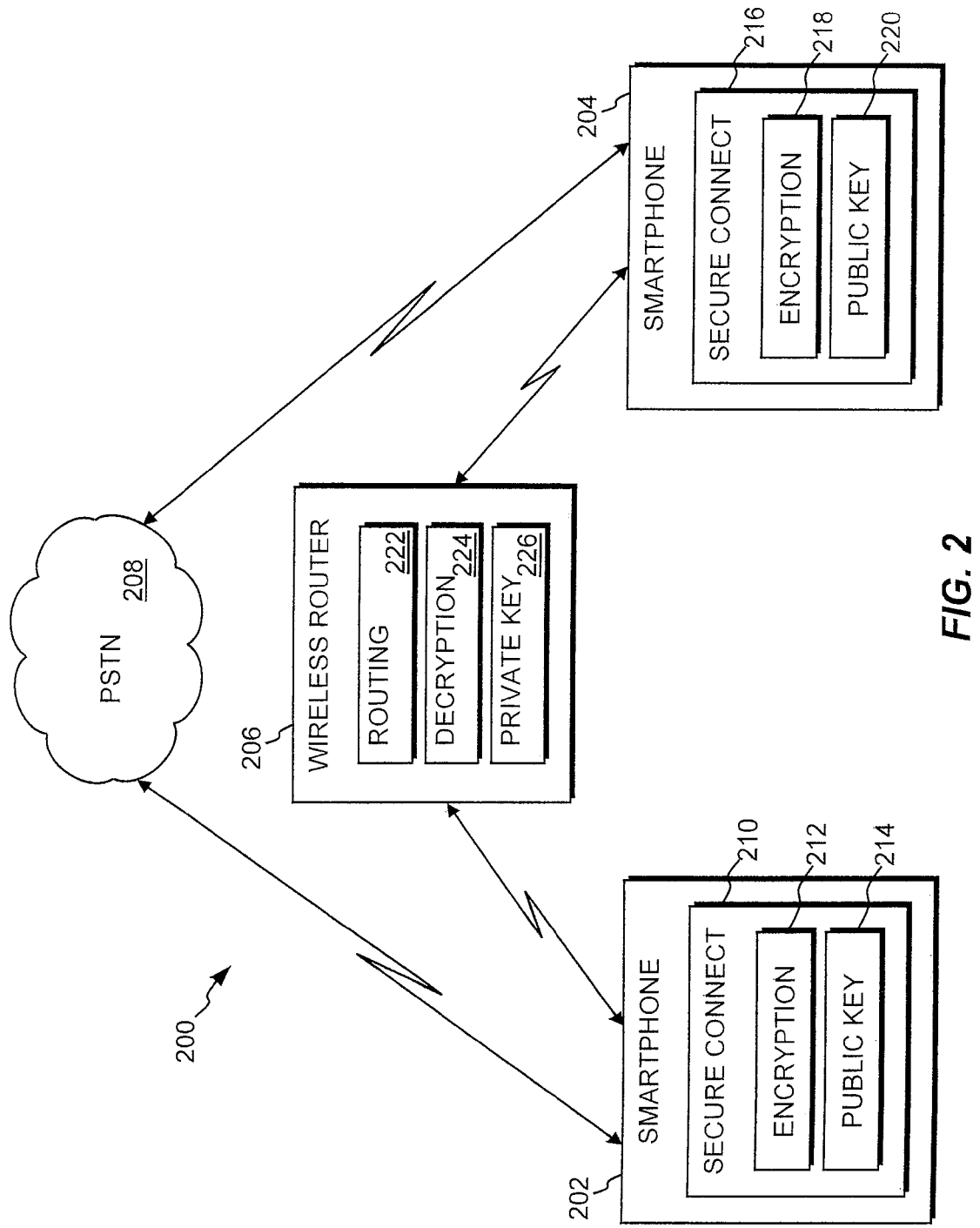
FIG. 2 is a functional block diagram illustrating a secure communication system in a wireless environment, in accordance with a second embodiment of the present invention.

FIG. 2 is a functional block diagram illustrating a secure communication system 200 in a wireless environment, in accordance with a second embodiment of the present invention. This embodiment is similar to the embodiment described with respect to FIG. 1, except that the secure communication controlled in this embodiment is a telephone call between smartphones 202 and 204. Secure communication system 200 includes smartphones 202 and 204, each of which is connected to a telephone network 208, which in a preferred embodiment is the public switched telephone network (PSTN), but can be any suitable telecommunications network in accordance with an embodiment of the invention, and also to a wireless local area network controlled by wireless router 206. In this exemplary embodiment, wireless router 206 operates in the same general manner described above with respect to wireless router 104.

Smartphones 202 and 204 include secure connect programs 210 and 216, respectively. Secure connect programs 210 and 216 include encryption modules 212 and 218, and public keys 214 and 220, respectively. Secure connect programs 210 and 216 operate in one of two modes, depending on whether they are operating in response to a phone call being placed or received on the smartphone on which they reside. For example, when smartphone 202 is within range of wireless router 206 and places a phone call to smartphone 204, encryption module 212 of secure connect program 210, on calling smartphone 202, generates a pseudo-random verification message, for example, based on the current date and time. The verification message does not need to be lengthy, and the content of the message is unimportant. The verification message is encrypted by encryption module 212 using public key 214, and is transmitted to smartphone 204 via the PSTN 208 as, for example, a Short Message Service (SMS) message. Secure connect program 216 on smartphone 204 receives the SMS message and transmits the encrypted verification message contained in the SMS message to decryption module 224 on wireless router 206 via the WLAN created by the wireless router. Similar to the operation of wireless router 104, of the embodiment described in FIG. 1, wireless router 206 decrypts the received encrypted verification message using private key 226 installed on wireless router 206 and transmits the decrypted verification message to secure connect program 216. Secure connect program 216 on smartphone 204 then transmits the decrypted verification message to secure connect program 210 on smartphone 202. If secure connect program 210 on smartphone 202 determines that the decrypted verification message received from smartphone 204 matches the verification message that secure connect program 210 encrypted and transmitted to secure connect program 216, then secure connect program 210 allows the telephone call placed by smartphone 202 to smartphone 204 to continue. If secure connect program 210 determines that the decrypted verification message received from smartphone 204 does not match the verification message that secure connect program 210 encrypted and transmitted to secure connect program 216, then secure connect program 210 terminates the telephone call placed by smartphone 202 to smartphone 204.

In this manner, telephone calls placed by a smartphone in a secure environment defined geographically by the range of one or more wireless routers can be limited to called parties that are also within range of the wireless routers.

In certain embodiments, rather than the decrypted verification message being sent by the called smartphone back to the calling smartphone, a hash value of the decrypted message can be returned. Also, in certain embodiments, the calling phone does not necessarily need to be within range of the wireless router containing the private key. In such embodiments, the calling smartphone would be limited to connecting to called smartphones within range of the wireless router because the called smartphone would still need to decrypt the verification message using the private key residing on the wireless router.

Similar to the embodiments described above with respect to FIG. 1, private keys 226 can be securely maintained in a central store, and requested by decryption module 224 when needed. Similar schemes as described above may be implemented to ensure the security of the exchange of the request and the private key between decryption module 224 and the central store.

Figure 3:
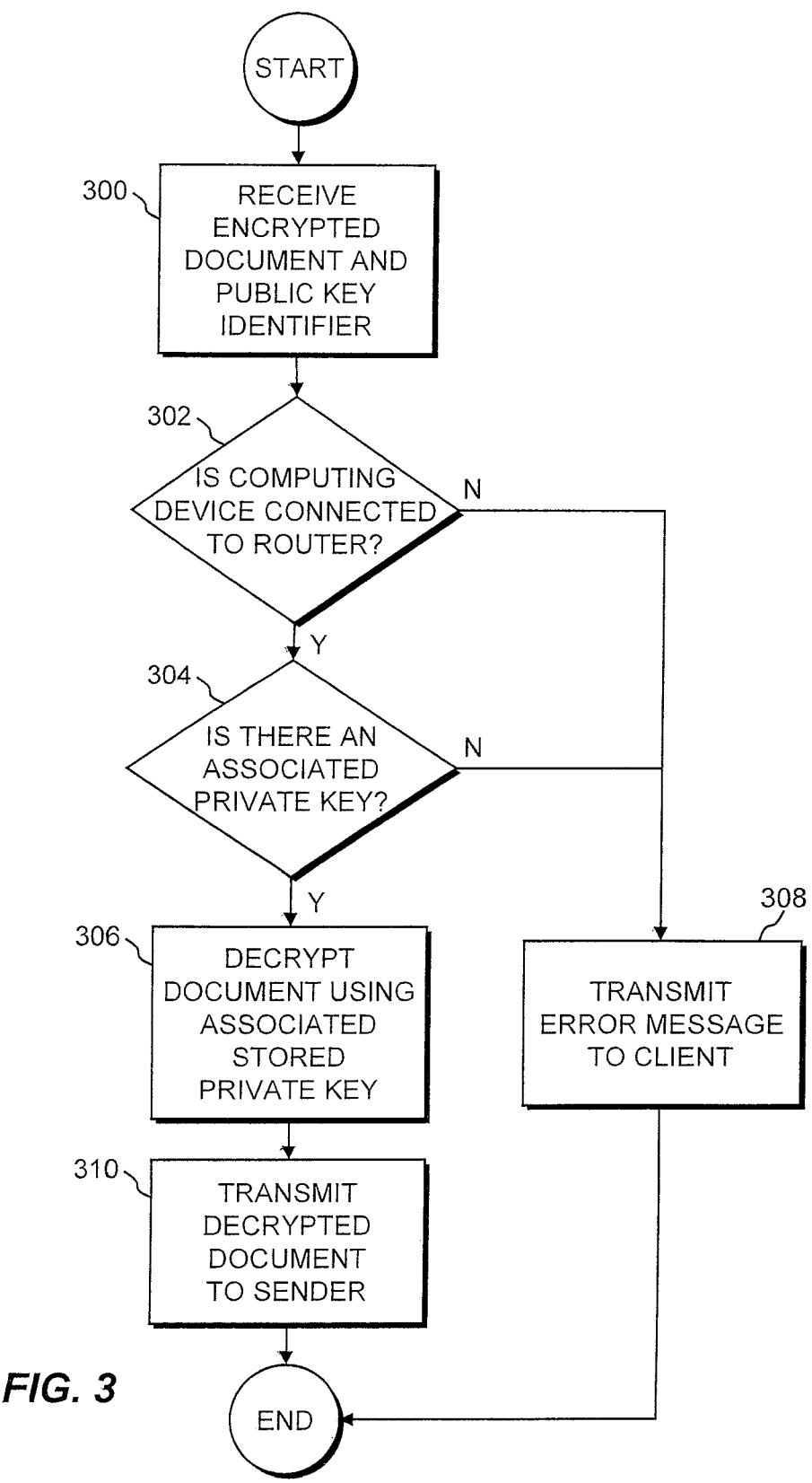
FIG. 3 is a flowchart illustrating operational steps of a decryption program on a wireless device of the secure communication system of FIG. 1, in accordance with an embodiment of the present invention.

FIG. 3 is a flowchart illustrating operational steps of decryption module 122 on wireless router 104 of the secure communication system 100 of FIG. 1, in accordance with an embodiment of the present invention. When an email client, for example, email program 110 on computing device 102 attempts to open an encrypted email message, the message and a public key identifier associated with public key 120 is transmitted to the decryption module on the wireless router to which the email client is connected, for example, decryption module 122 on wireless router 104 (step 300).

When the encrypted document and public key identifier are received by decryption module 122 (step 300), wireless router 104 confirms that computing device 102, from which the encrypted document and public key identifier were received, is connected to the wireless router (decision step 302). If the encrypted document and public key identifier are received by decryption module 122 from a computing device not connected to wireless router 104 (decision step 302, "No" branch), then an error message is sent to the email client (step 308) and no further processing of the encrypted document is performed. If the encrypted document and public key identifier are received by decryption module 122, from a computing device that is connected to wireless router 104, (decision step 302, "Yes" branch), then decryption module 122 determines if a private key 124 corresponding to the received public key identifier resides on wireless router 104 (decision step 304).

If a private key 124 corresponding to the received public key identifier is not available on wireless router 104 (decision step 304, "No" branch), then an error message is sent to the email client (step 308) and no further processing of the encrypted document is performed. If a private key 124 corresponding to the received public key identifier is available on wireless router 104 (decision step 304, "Yes" branch), then the received encrypted document is decrypted by decryption module 122 using the associated private key 124 (step 306).

After the document has been successfully decrypted (step 306), the decrypted document is transmitted back to the sending email client (step 310), for example, email program 110 on computing device 102, and processing ends.

Figure 4:
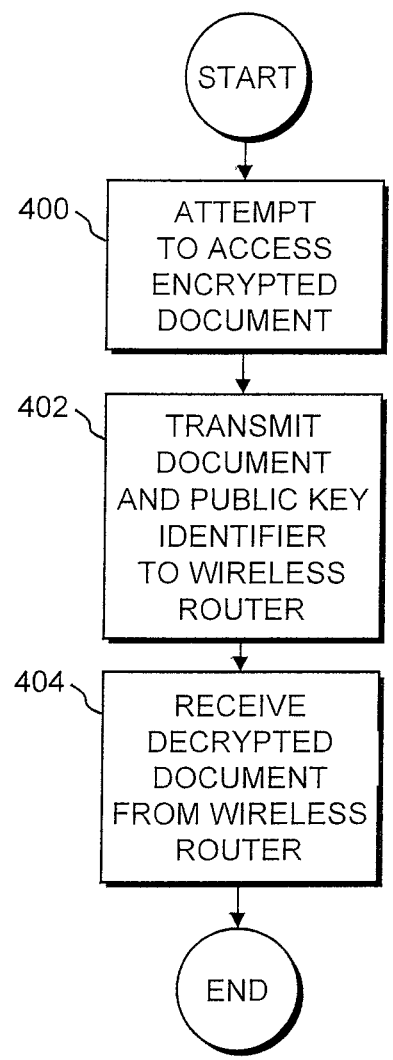
FIG. 4 is a flowchart illustrating operational steps of an encryption program on a computing device of the secure communication system of FIG. 1, in accordance with an embodiment of the present invention.

FIG. 4 is a flowchart illustrating operational steps of one aspect of email program 110 on a computing devices 102, of secure communication system 100 of FIG. 1, in accordance with an embodiment of the present invention. When email program 110 attempts to access an encrypted email message (step 400), the encrypted message and the associated public key identifier are transmitted to decryption module 122 on wireless router 104 (step 402). The associated public key identifier can be identified, for example, from the name of the sender in the encrypted email message's header. After decryption module 122 has successfully decrypted the email message, the decrypted document is transmitted to computing device 102, where it is received by the sending email program 110 (step 404) and is displayed for viewing. Because the message includes attributes that inhibit the copying, forwarding, or printing of the decrypted message, the user typically can only exit viewing of the decrypted message after it has been read.

Figure 5:
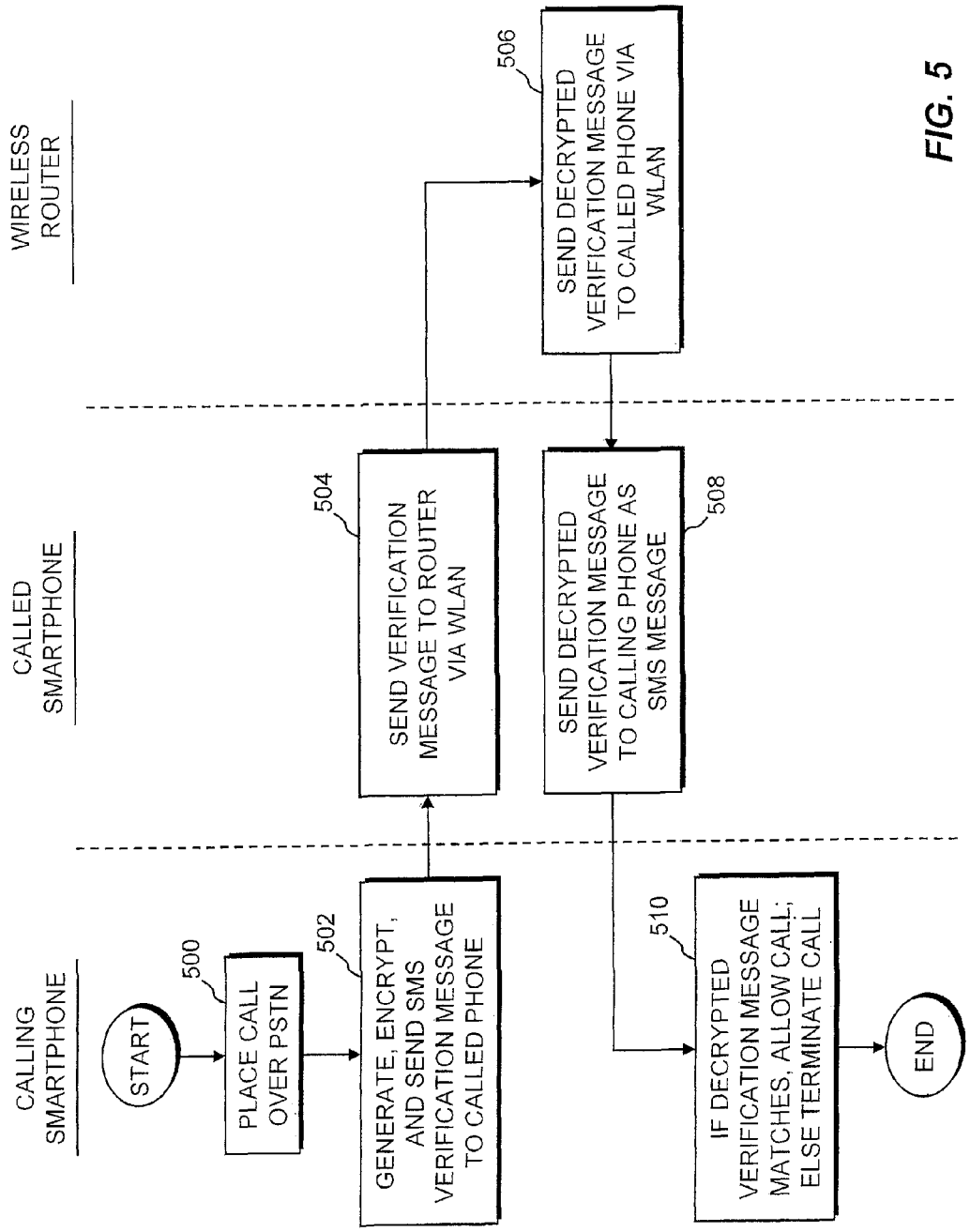
FIG. 5 is a flowchart illustrating operational steps of components of the secure communication system of FIG. 2, in accordance with an embodiment of the present invention.

FIG. 5 is a flowchart illustrating operational steps of components of the secure communication system of FIG. 2, in accordance with an embodiment of the present invention. A smartphone, for example smartphone 202, places a call over the PSTN 208 to another smartphone, for example smartphone 204 (step 500). When the call is placed, secure connect module 210 on calling smartphone 202 generates a verification message, encrypts the message with encryption module 212 using public key 214, and sends the encrypted verification message as an SMS message over the PSTN to called smartphone 204 (step 502).

Secure connect program 216 on called Smartphone 204 then sends the encrypted verification message received in the SMS message to decryption module 224 on wireless router 206 via the WLAN created by wireless router 206 (step 504). Decryption module 224 on wireless router 206 then decrypts the verification message using private key 226, and sends the decrypted verification message to secure connect program 216 on called smartphone 204 via the WLAN created by wireless router 206 (step 506).

Secure connect program 216 then sends the decrypted verification message to secure connect module 210 on calling phone 202 as an SMS message (step 508). Secure connect program 210 then determines if the decrypted verification message received from called smartphone 204 matches the original verification message created by secure connect module 210. If the received decrypted verification message matches the original verification, then secure connect module 210 allows the call on calling smartphone 202 to continue; if the received decrypted verification message does not match the original verification, then secure connect module 210 terminates the call on calling smartphone 202 (step 510). In certain embodiments, a timeout period can be defined such that if a response from the calling phone in the form of the decrypted verification is not received, then secure connect module 210 terminates the call on calling smartphone 202.

Figure 6:
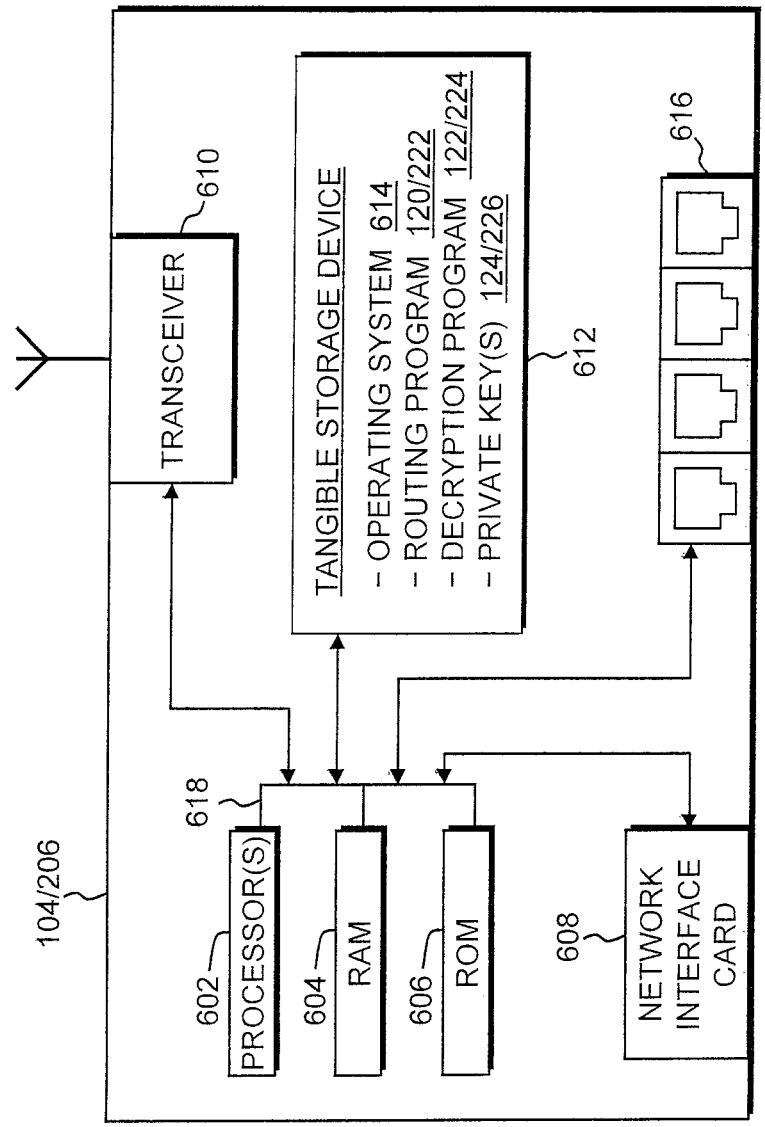
FIG. 6 is a block diagram of components of a wireless device of the secure communication systems of FIGS. 1 and 2, in accordance with embodiments of the present invention.

FIG. 6 is a block diagram of components of wireless router 104 and 206 of the secure communication systems 100 and 200 of FIGS. 1 and 2, respectively, in accordance with embodiments of the present invention. Wireless routers 104/206 can include one or more processors 602, one or more computer-readable RAMs 604, one or more computer-readable ROMs 606, one or more tangible storage devices 612, a network interface card 608, a transceiver 610, and one or more ports 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within a system.

One or more operating systems 614 and programs 120/222 and 122/224 and private keys 124/226 on wireless routers 104/206 are stored on computer-readable tangible storage device 612 for execution or access by one or more processors 602 via one or more RAMs 604 (which typically include cache memory). In the illustrated embodiment, computer-readable tangible storage device 612 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Wireless routers 102/206 will typically include a network interface card 608, such as a TCP/IP adapter card. The programs 120/222 and 122/224 and private keys 124/226 on wireless router 104/206 can be downloaded to the wireless router from an external computer or external storage device via a network (for example, the Internet, a local area network or other, wide area network or wireless network) and network interface card 608. The programs and private keys can then be loaded into computer-readable tangible storage device 612. The network may comprise copper wires, optical fibers, wireless transmission, routers, firewalls, switches, gateway computers and/or edge servers.

Figure 7:
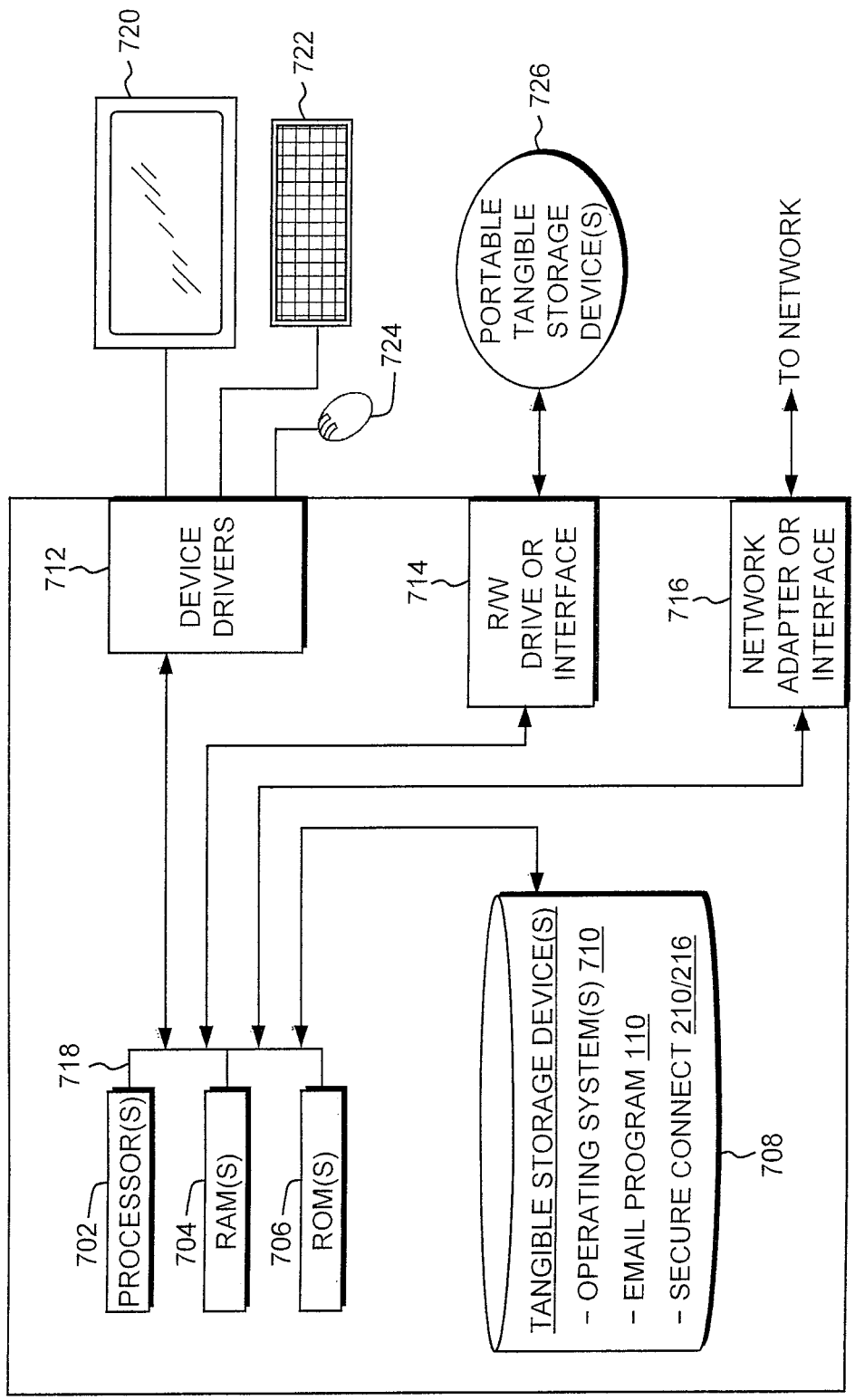
FIG. 7 is a block diagram of components of a computing device of the secure communication systems of FIGS. 1 and 2, in accordance with embodiments of the present invention.

FIG. 7 is a block diagram of components of computing device 102, and generally smartphones 202 and 204, of the secure communication systems 100 and 200 of FIGS. 1 and 2, respectively, in accordance with an embodiment of the present invention. Computing device 102 and smartphones 202 and 204 can include one or more processors 702, one or more computer-readable RAMs 704, one or more computer-readable ROMs 706, one or more tangible storage devices 708, device drivers 712, read/write drive or interface 714, network adapter or interface 716, all interconnected over a communications fabric 718. Communications fabric 718 can be implemented with any architecture designed for passing data and/or control information between processors (such as microprocessors, communications and network processors, etc.), system memory, peripheral devices, and any other hardware components within a system.

One or more operating systems 710, email program 110 on computing device 102, and secure connect programs 210 and 216 on smartphones 202 and 204, respectively, are stored on one or more of the computer-readable tangible storage devices 708 for execution by one or more of the processors 702 via one or more of the respective RAMs 704 (which typically include cache memory). In the illustrated embodiment, each of the computer-readable tangible storage devices 708 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 102 and smartphones 202 and 204 can also include a R/W drive or interface 714 to read from and write to one or more portable computer-readable tangible storage devices 726. Email program 110 on computing device 102 and secure connect programs 210 and 216 on smartphones 202 and 204, respectively, can be stored on one or more of the portable computer-readable tangible storage devices 726, read via the respective R/W drive or interface 714 and loaded into the respective computer-readable tangible storage device 708.

Computing device 102 and smartphones 202 and 204 can also include a network adapter or interface 716, such as a TCP/IP adapter card or wireless communication adapter (such as a 4G wireless communication adapter using OFDMA technology). Email program 110 on computing device 102 and secure connect programs 210 and 216 on smartphones 202 and 204, respectively, can be downloaded to the computing device from an external computer or external storage device via a network (for example, the Internet, a local area network or other, wide area network or wireless network) and network adapter or interface 716. From the network adapter or interface 716, the programs are loaded into the computer-readable tangible storage device 708. The network may comprise copper wires, optical fibers, wireless transmission, routers, firewalls, switches, gateway computers and/or edge servers.

Computing device 102 and smartphones 202 and 204 can also include a display screen 720, a keyboard or keypad 722, and a computer mouse or touchpad 724. Device drivers 712 interface to display screen 720 for imaging, to keyboard or keypad 722, to computer mouse or touchpad 724, and/or to display screen 720 for pressure sensing of alphanumeric character entry and user selections. The device drivers 712, R/W drive or interface 714 and network adapter or interface 716 can comprise hardware and software (stored in computer-readable tangible storage device 708 and/or ROM 706).

Based on the foregoing, a computer system, method and program product have been disclosed for a secure communication method. However, numerous modifications and substitutions can be made without deviating from the scope of the present invention. Therefore, the present invention has been disclosed by way of example and not limitation.

What is claimed is:

1. A method for providing secure communication, the method comprising:
    a first computing device to receive, over a network from a second computing device, a verification message generated by the second computing device in association with initiating a communication to the first computing device over the network, wherein the verification message is encrypted by the second computing device using a first cryptographic key;
    the first computing device transmitting to a wireless device via a wireless channel between the first computing device and the wireless device, the encrypted verification message, wherein the first computing device is located within a geographical area that is fixed by a location of the wireless device and defined by a signaling range of the wireless device;
    the first computing device receiving, from the wireless device over the wireless channel, a decrypted verification message decrypted from the encrypted verification message by the wireless device using a second cryptographic key associated with the first cryptographic key; and
    the first computing device transmitting over the network to the second computing device, the decrypted verification message, wherein if the second computing device determines that the decrypted verification message matches the verification message, the second computing device allows the communication to the first computing device to proceed,
    wherein the wireless device is a wireless router, the wireless channel between the first computing device and the wireless router is established as part of a wireless local area network (WLAN) created by the wireless router, and wherein the first computing device receives the decrypted verification message over the WLAN further comprises the first computing device receiving the decrypted verification message over the WLAN in accordance with a User Datagram Protocol (UDP) over a specified port.

2. The method in accordance with claim 1, wherein the first and second computing devices are smartphones.

3. The method in accordance with claim 1, wherein the first computing device transmitting the decrypted verification message to the second computing device over the network, includes transmitting the decrypted verification message to the second computing device as Short Message Service (SMS) messages.

4. The method in accordance with claim 1, wherein the first cryptographic key is a public key of an asymmetric cryptographic key pair, and the second cryptographic key is a private key of the asymmetric cryptographic key pair.

5. The method in accordance with claim 1, wherein initiating the communication includes initiating a phone call.

6. The method in accordance with claim 1, wherein initiating the communication includes initiating a document transfer.

7. The method in accordance with claim 1, wherein the first computing device transmitting over the network to the second computing device, includes creating a hash of the decrypted verification message to compare to a hash of the verification message.

8. The method in accordance with claim 1, further comprising:
    the first computing device transmitting an encrypted document associated with the communication, received from the second computing device, to the wireless device; and
    the first computing device receiving a decrypted version of the encrypted document from the wireless device.

9. The method in accordance with claim 1, wherein the second encryption key used by the wireless device to decrypt the encrypted verification message is securely maintained in a central store and requested by the wireless device as needed.

10. A method for providing secure communication, the method comprising:
    a first computing device to receive, over a network from a second computing device, a verification message generated by the second computing device in association with initiating a communication to the first computing device over the network, wherein the verification message is encrypted by the second computing device using a first cryptographic key;
    the first computing device transmitting to a wireless device via a wireless channel between the first computing device and the wireless device, the encrypted verification message, wherein the first computing device is located within a geographical area that is fixed by a location of the wireless device and defined by a signaling range of the wireless device;
    the first computing device receiving, from the wireless device over the wireless channel, a decrypted verification message decrypted from the encrypted verification message by the wireless device using a second cryptographic key associated with the first cryptographic key; and
    the first computing device transmitting over the network to the second computing device, the decrypted verification message, wherein if the second computing device determines that the decrypted verification message matches the verification message, the second computing device allows the communication to the first computing device to proceed,
    wherein the wireless device is a wireless router, the wireless channel between the first computing device and the wireless router is established as part of a wireless local area network (WLAN) created by the wireless router, and wherein the first computing device receives the decrypted verification message over the WLAN.

11. The method in accordance with claim 10, wherein the first cryptographic key is a public key of an asymmetric cryptographic key pair, and the second cryptographic key is a private key of the asymmetric cryptographic key pair.

12. The method in accordance with claim 10, wherein the first computing device transmitting over the network to the second computing device, includes creating a hash of the decrypted verification message to compare to a hash of the verification message.

13. The method in accordance with claim 10, further comprising:
the first computing device transmitting an encrypted document associated with the communication, received from the second computing device, to the wireless device; and
the first computing device receiving a decrypted version of the encrypted document from the wireless device.

14. The method in accordance with claim 10, wherein the second encryption key used by the wireless device to decrypt the encrypted verification message is securely maintained in a central store and requested by the wireless device as needed.

15. A method for providing secure communication, the method comprising:
a first computing device to receive, over a network from a second computing device, a verification message generated by the second computing device in association with initiating a communication to the first computing device over the network, wherein the verification message is encrypted by the second computing device using a first cryptographic key;
the first computing device transmitting to a wireless device via a wireless channel between the first computing device and the wireless device, the encrypted verification message, wherein the first computing device is located within a geographical area that is fixed by a location of the wireless device and defined by a signaling range of the wireless device;
the first computing device receiving, from the wireless device over the wireless channel, a decrypted verification message decrypted from the encrypted verification message by the wireless device using a second cryptographic key associated with the first cryptographic key; and
the first computing device transmitting over the network to the second computing device, the decrypted verification message, wherein if the second computing device determines that the decrypted verification message matches the verification message, the second computing device allows the communication to the first computing device to proceed,
wherein the first computing device receives the decrypted verification message over a wireless local area network (WLAN) in accordance with a User Datagram Protocol (UDP) over a specified port.

16. The method in accordance with claim 15, wherein the first cryptographic key is a public key of an asymmetric cryptographic key pair, and the second cryptographic key is a private key of the asymmetric cryptographic key pair.

17. The method in accordance with claim 15, wherein the first computing device transmitting over the network to the second computing device, includes creating a hash of the decrypted verification message to compare to a hash of the verification message.

18. The method in accordance with claim 15, further comprising:
the first computing device transmitting an encrypted document associated with the communication, received from the second computing device, to the wireless device; and
the first computing device receiving a decrypted version of the encrypted document from the wireless device.

19. The method in accordance with claim 15, wherein the second encryption key used by the wireless device to decrypt the encrypted verification message is securely maintained in a central store and requested by the wireless device as needed.

* * * * *